United States Patent
Choi et al.

(10) Patent No.: US 11,631,849 B2
(45) Date of Patent: Apr. 18, 2023

(54) LITHIUM COMPOSITE OXIDE AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Hyun Jong Yu, Cheongju-si (KR); Chang Woo Lee, Cheongju-si (KR); Yu Kyung Chun, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 198 days.

(21) Appl. No.: 17/095,135

(22) Filed: Nov. 11, 2020

(65) Prior Publication Data
US 2021/0167381 A1   Jun. 3, 2021

(30) Foreign Application Priority Data

Nov. 29, 2019 (KR) ............ 10-2019-0156946
Apr. 28, 2020 (KR) ............ 10-2020-0051352

(51) Int. Cl.
| | |
|---|---|
| H01M 4/525 | (2010.01) |
| C01G 53/00 | (2006.01) |
| H01M 4/36 | (2006.01) |
| H01M 4/485 | (2010.01) |
| H01M 10/0525 | (2010.01) |
| H01M 4/02 | (2006.01) |

(52) U.S. Cl.
CPC ............ *H01M 4/525* (2013.01); *C01G 53/50* (2013.01); *H01M 4/366* (2013.01); *H01M 4/485* (2013.01); *H01M 10/0525* (2013.01); *C01P 2002/54* (2013.01); *C01P 2002/60* (2013.01); *C01P 2002/72* (2013.01); *C01P 2002/77* (2013.01); *C01P 2002/78* (2013.01); *C01P 2002/85* (2013.01); *C01P 2004/04* (2013.01); *C01P 2004/50* (2013.01); *C01P 2004/84* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | |
|---|---|---|
| 2018/0013145 A1 | 1/2018 | Choi et al. |
| 2018/0233739 A1 | 8/2018 | Park et al. |
| 2019/0006697 A1* | 1/2019 | Danko ............... H01M 4/139 |

FOREIGN PATENT DOCUMENTS

WO   2018/123951 A1   7/2018

OTHER PUBLICATIONS

Fengxia Xin et al.; "Li—Nb—O Coating/Substitution Enhances the Electrochemical Performance of the LiNi0.8Mn0.1Co0.1O2 (NMC 811) Cathode"; Aug. 30, 2019; ACS Applied Materials & Interfaces; vol. 11; No. 38; pp. 34889-34894 (Year: 2019).*

(Continued)

*Primary Examiner* — Daniel S Gatewood
(74) *Attorney, Agent, or Firm* — Studebaker & Brackett PC

(57) ABSTRACT

The present invention relates to a lithium composite oxide having improved stability and electrical characteristics as a positive electrode material by inhibiting an interfacial side reaction in the lithium composite oxide and improving the stability of a crystal structure and ion conductivity, and a lithium secondary battery including the same.

11 Claims, 8 Drawing Sheets

(56) References Cited

OTHER PUBLICATIONS

Fengxia Xin et al.; "Li—Nb—O Coating/Substitution Enhances the Electrochemical Performance of the LiNi0.8Mn0.1 Co0.1O2 (NMC 811) Cathode"; ACS Applied Materials & Interfaces; vol. 11; No. 38; Aug. 30, 2019 pp. 34889-34894; with Supporting Information (pp. S1-S8).

* cited by examiner

LITHIUM COMPOSITE OXIDE AND LITHIUM SECONDARY BATTERY COMPRISING THE SAME

CROSS-REFERENCE TO RELATED APPLICATION

This application claims priority to and the benefit of Korean Patent Application Nos. 10-2019-156946, filed on Nov. 29, 2019, and 10-2020-0051352, filed on Apr. 28, 2020, the disclosure of which is incorporated herein by reference in their entirety.

BACKGROUND

1. Field of the Invention

The present invention relates to a lithium composite oxide having improved stability and electrical characteristics as a positive electrode material by inhibiting interfacial side reactions in the lithium composite oxide and improving the stability of a crystal structure and ion conductivity, and a lithium secondary battery including the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

To make up for such disadvantages, as a positive electrode active material for a secondary battery, the demand for Ni-rich positive electrode active materials having an Ni content of 60% or more began to increase. Particularly, these Ni-rich positive electrode active materials are suggested as a composite oxide in which some of Ni is substituted with Co, Mn and/or Al. However, these Ni-rich positive electrode active materials exhibit high capacity characteristics, but have a problem of structural instability caused by Li/Ni cation mixing as the Ni content in a positive electrode active material increases. Due to the structural instability of the positive electrode active material, a lithium secondary battery may be rapidly deteriorated at a high temperature as well as room temperature.

Recently, as batteries used in electric vehicles are required to have higher capacity characteristics and output characteristics in order to improve a driving distance after fully charging an electric vehicle, the various methods for a compositional change, particle shape and size control, doping or surface treatment of a lithium composite oxide used as a positive electrode active material are being studied. However, the research has not yet achieved the stability of a positive electrode active material and the electrical characteristics of a secondary battery, which is in trade-off relationship, to sufficiently satisfactory levels.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

Accordingly, the present invention is directed to providing a lithium composite oxide for a positive electrode active material, which is able to improve both stability and electrical characteristics as a positive electrode active material for a lithium secondary battery.

In addition, the present invention is directed to providing a lithium secondary battery using a positive electrode, which includes the lithium composite oxide defined herein.

The objects of the present invention are not limited to the above-mentioned objects (e.g., for electric cars), and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

One aspect of the present invention provides a lithium composite oxide, which includes primary particles enabling lithium intercalation and deintercalation and secondary particles in which the primary particles are aggregated, and in which there is a niobium (Nb)-containing oxide in at least a part of a region selected from the interface between the primary particles and the surface of the secondary particle.

Here, the interplanar distance (d1) of a (003) plane of the crystal structure in the primary particle and the interplanar distance (d2) of a (400) plane of the crystal structure in the interface between the primary particles may satisfy the Relational Expression 1 below:

$$d1 > d2 \quad \text{<Relational Expression 1>}$$

Here, the interplanar distance (d1) of the (003) plane of the crystal structure in the primary particle may be 0.40 nm or more, and the interplanar distance (d2) of the (400) plane of the crystal structure in the interface between the primary particles may be 0.30 nm or less.

In one embodiment, the primary particle may be doped with niobium (Nb), and in this case, the niobium (Nb) in the primary particle may form a solid solution with the primary particles. In addition, the niobium (Nb) doped in the primary particle may exhibit a concentration gradient decreasing from a surface region to a core region of the primary particle.

In this embodiment, the primary particle may be represented by Formula 1 below:

$$Li_wNi_{1-(x+y+z+z')}Co_xM1_yM2_zNb_{z'}O_2 \quad \text{[Formula 1]}$$

(Here, M1 is at least one selected from Mn and Al,

M2 is at least one selected from P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu, M1 and M2 are different elements, and $0.5 \leq w \leq 1.5$, $0 \leq x \leq 0.50$, $0 \leq y \leq 0.20$, $0 \leq z \leq 0.20$, and $0 \leq z' \leq 0.20$)

In one embodiment, there is a first coating layer covering at least a part of the surface of the primary particle, and the first coating layer may include a niobium (Nb)-containing oxide.

Here, the first coating layer may further include an oxide represented by Formula 2 below:

$$Li_aM3_bO_c \quad \text{[Formula 2]}$$

(Here, M3 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 \leq b \leq 8$, and $2 \leq c \leq 13$)

In an additional embodiment, the lithium composite oxide may include a second coating layer covering at least a part of the surface of the secondary particle. Here, the second coating layer may include an oxide represented by Formula 3 below:

$$Li_aM4_bO_c \quad \text{[Formula 3]}$$

(Here,

M4 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 \leq b \leq 8$, and $2 \leq c \leq 13$)

In addition, another aspect of the present invention provides a lithium secondary battery using a positive electrode, which includes the above-described lithium composite oxide.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a lithium composite oxide according to the present invention and a lithium secondary battery using a positive electrode including the lithium composite oxide will be described in further detail.

Lithium Composite Oxide

According to one aspect of the present invention, a lithium composite oxide including primary particles enabling lithium intercalation and deintercalation and secondary particles in which the primary particles are aggregated is provided. The lithium composite oxide may serve as a positive electrode active material of a lithium secondary battery.

Here, the primary particle refers to one grain or crystallite, and the secondary particle refers to an aggregate formed by aggregating a plurality of primary particles. The primary particle may have a rod shape, an oval shape and/or an irregular shape. There may be a void and/or a grain boundary between the primary particles constituting the secondary particle.

For example, an inner void may be formed by the primary particle being spaced apart from a neighboring primary particle in the secondary particle. In addition, the primary particles may be in contact with the inner voids without forming a grain boundary by being in contact with neighboring primary particles, thereby forming a surface present inside the secondary particle. Meanwhile, the external atmosphere-exposed surface of the primary particle located on the outermost surface of the secondary particle forms a surface of the secondary particle.

Here, the average major axis length of the primary particle is in a range of 0.1 to 5 m, and preferably, 0.1 to 2 m, and thus the optimal density of a positive electrodes prepared using positive electrode active materials according to various embodiments of the present invention may be realized. In addition, the average particle diameter of the secondary particles may vary according to the number of aggregated primary particles, but may be in a range of 1 to 30 m.

Figure 1:
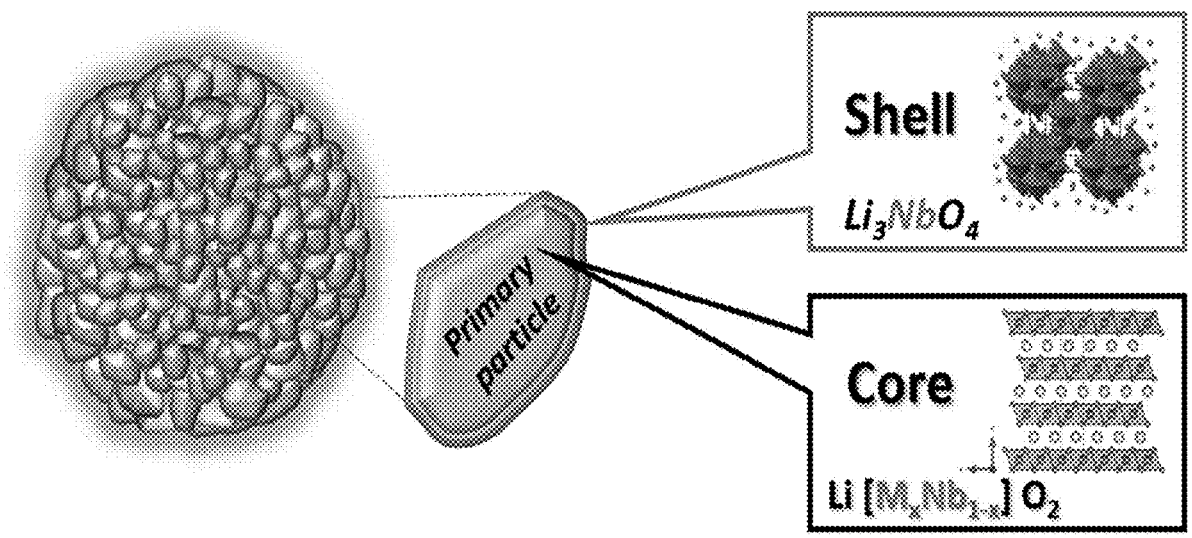
FIG. 1 is a schematic diagram of a lithium composite oxide according to one embodiment of the present invention.

Referring to FIG. 1 illustrating the schematic diagram of the lithium composite oxide according to one embodiment of the present invention, the lithium composite oxide according to one embodiment of the present invention may include a niobium (Nb)-containing oxide present in at least a part of a region selected from the interface between primary particles and the surface of the secondary particle.

Here, the interface between primary particles may refer to a surface defined by two primary particles adjacent thereto, that is, a surface at which two adjacent primary particles are in contact with each other. In addition, the interface between the primary particles may refer to an independent surface of the primary particle.

The surface of the secondary particle refers to the outermost surface of at least one secondary particle in which the primary particles are aggregated, and the outermost surface of the secondary particle may refer to an exposed surface of the primary particle located on the outermost surface of the secondary particle.

Since the niobium (Nb)-containing oxide, as a lithium ion conductive material, is present in at least a part of a region selected from the interface between the primary particles defined above and the surface of the secondary particle, a lithium ion diffusion pathway may be formed.

The niobium (Nb)-containing oxide may include a niobium (Nb)-only oxide such as NbO or $Nb_2O_5$ and a composite oxide of lithium and niobium (Nb) such as $LiNbO_3$, $LiNb_3O_8$ or $Li_3NbO_4$. In addition, the type of niobium (Nb)-containing oxide is not limited to the above-mentioned examples, and the niobium (Nb)-containing oxide may be present in the form of various niobium (Nb)-only oxides, composite oxides of lithium and niobium (Nb) or composite oxides of lithium, niobium (Nb) and a different metal element.

As described above, the lithium composite oxide according to one embodiment of the present invention contains a niobium (Nb)-containing oxide present in at least a part of a region selected from the interface between the primary particles and the surface of the secondary particle.

Here, the interplanar distance (d1) of a (003) plane of the crystal structure in the primary particle and the interplanar distance (d2) of a (400) plane of the crystal structure in the interface between the primary particles preferably satisfy Relational Expression 1 below:

$$d1>d2 \qquad \text{<Relational Expression 1>}$$

The interplanar distance (d1 or d2) refers to the average value of interplanar distances measured from the result of analyzing a crystal structure by, for example, TEM analysis of the lithium composite oxide.

Since there is the niobium (Nb)-containing oxide at the interface between the primary particles, and the interplanar distance (d2) of the (400) plane of the crystal structure in the interface between the primary particles is smaller than the interplanar distance (d1) of the (003) plane of the crystal structure in the primary particle, the crystal structure of the lithium composite oxide can be stabilized.

In addition, therefore, when the lithium composite oxide is used as a positive electrode active material for a lithium secondary battery, by inhibiting a side reaction between the primary particles included in the lithium composite oxide, both of the stability and electrical characteristics of the positive electrode active material may be improved.

Here, the interplanar distance (d1) of the (003) plane of the crystal structure in the primary particle may be 0.40 nm or more, and preferably, 0.45 nm or more, and the interplanar distance (d2) of the (400) plane of the crystal structure in the interface between the primary particles may be 0.30 nm or less, and preferably, 0.25 nm or less.

Accordingly, the interplanar distance (d1) of the (003) plane of the crystal structure in the primary particle and the interplanar distance (d2) of the (400) plane of the crystal structure in the interface between the primary particles may additionally satisfy Relational Expression 2 below:

$$d1-d2 \geq 0.10 \qquad \text{<Relational Expression 2>}$$

In the lithium composite oxide, when the interplanar distance (d1) of the (003) plane of the crystal structure in the primary particle and the interplanar distance (d2) of the (400) plane of the crystal structure in the interface between the primary particles do not satisfy at least one selected from Relational Expression 1 and Relational Expression 2, the effect of stabilizing a crystal structure of the lithium composite oxide is insignificant or rather degraded.

In addition, the lithium composite oxide may be a high-Ni-type lithium composite oxide containing a high content of nickel. The high-Ni-type lithium composite oxide shows a tendency to reduce the stability of the crystal structure and thermal stability as the nickel content in the lithium composite oxide increases.

However, according to the present invention, in the lithium composite oxide, as the interplanar distance (d1) of the (003) plane of the crystal structure in the primary particle and the interplanar distance (d2) of the (400) plane of the crystal structure in the interface between the primary particles satisfy Relational Expression 1 and Relational Expression 2, although the nickel content in the lithium composite oxide increases, a decrease in stability of the crystal structure and thermal stability may be prevented.

In another embodiment of the present invention, niobium (Nb) may be present, as a niobium (Nb)-containing oxide, in at least a part of a region selected from the interface between the primary particles and the surface of the secondary particle, and may be present in the primary particles by doping. In this case, the niobium (Nb) may form a solid solution with the primary particles.

In the embodiment, the primary particles may be represented by Formula 1 below:

$$Li_wNi_{1-(x+y+z+z')}Co_xM1_yM2_zNb_{z'}O_2 \qquad \text{[Formula 1]}$$

(Here,

M1 is at least one selected from Mn and Al,

M2 is at least one selected from P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu, M1 and M2 are different elements, and $0.5 \leq w \leq 1.5$, $0 \leq x \leq 0.50$, $0 \leq y \leq 0.20$, $0 \leq z \leq 0.20$, and $0 \leq z' \leq 0.20$)

In the primary particles represented by Formula 1, dopants represented by M2 may be uniformly distributed in the primary particle, or may exhibit a concentration gradient decreasing from a surface region to a core region of the primary particle.

In addition, in the primary particle represented by Formula 1, niobium (Nb) may also be uniformly distributed in the primary particles, or may exhibit a concentration gradient decreasing from the surface region to the core region of the primary particle.

The niobium (Nb) present in the primary particles to exhibit a concentration gradient decreasing from the surface region to the core region of the primary particle may form a lithium ion diffusion pathway in the primary particle. The niobium (Nb) may form a solid solution with the primary particles.

In addition, the niobium (Nb) in the primary particles may exhibit a concentration gradient decreasing from the surface region to the core region of the secondary particle.

For example, a concentration of niobium (Nb) in the primary particles present in a region adjacent to the core of the secondary particle may be lower than that of niobium (Nb) in the primary particle present in a region adjacent to the surface region of the secondary particle. However, both of the concentration of niobium (Nb) in the primary particle present in a region adjacent to the surface of the secondary particle and the concentration of niobium (Nb) in the primary particle present in a region adjacent to the core of the secondary particle may exhibit a gradient decreasing from the surface region to the core of the secondary particle.

According to the above-described embodiment, since the primary particle is doped with niobium (Nb) and there is a niobium (Nb)-containing oxide in at least a part of a region selected from the interface between the primary particles and the surface of the secondary particle, the lithium composite oxide satisfies crystal structure-related characteristics according to Relational Expression 1 and Relational Expression 2, thereby improving the stability of a crystal structure and electrical characteristics of the lithium composite oxide.

In addition, the lithium composite oxide may include a coating layer covering at least a part of the surface(s) of the primary particle (e.g., the interface between the primary particles) and/or the secondary particle in which the primary particles are aggregated.

Specifically, the lithium composite oxide may include a first coating layer covering at least a part of the surface of the primary particle, and there may be the above-described niobium (Nb)-containing oxide in the first coating layer.

That is, when there is the niobium (Nb)-containing oxide at the interface between the primary particles, the niobium (Nb)-containing oxide may be provided as a first coating layer including the niobium (Nb)-containing oxide.

In addition, the first coating layer may further include an oxide represented by Formula 2 below:

$$Li_aM3_bO_c \quad \text{[Formula 2]}$$

(Here,

M3 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 \leq b \leq 8$, and $2 \leq c \leq 13$)

When the oxide represented by Formula 2 is further included in the first coating layer, in Formula 2, the metal element M3, like niobium (Nb), may also be uniformly distributed in the primary particle or exhibit a concentration gradient decreasing from the surface region to the core region of the primary particle.

In addition, the lithium composite oxide includes a second coating layer covering at least a part of the surface of the secondary particle, and the second coating layer may include an oxide represented by Formula 3 below.

$$Li_aM4_bO_c \quad \text{[Formula 3]}$$

(Here,

M4 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 \leq b \leq 8$, and $2 \leq c \leq 13$)

The second coating layer may be present as a layer continuously or discontinuously coating the surface of the secondary particle. When the coating layer is present discontinuously, it may have an island shape.

In addition, in some cases, an oxide present in the first coating layer and/or the second coating layer may be present in at least a part of the interface between the primary particles and the surface of the secondary particle, and in an inner void formed in the secondary particle.

The first coating layer and the second coating layer, which are formed as described above, may improve the lithium ion conductivity of the lithium composite oxide, and improve the stability of the lithium composite oxide as a positive electrode active material by reducing a side reaction with an electrolyte solution, which occurs on the surface(s) of the primary particle (e.g., the interface between the primary particles) and/or the secondary particle formed by aggregating the primary particles, which are included in the lithium composite oxide.

The first coating layer and/or the second coating layer may be present in the form of a solid solution in which there is no boundary between the primary particles and/or the secondary particles formed by aggregating the primary particles, but the present invention is not necessarily limited thereto.

In addition, the first coating layer and/or the second coating layer may reduce residual lithium in the lithium composite oxide and act as a diffusion path of lithium ions to have an influence on the improvement in efficiency characteristics of a lithium secondary battery.

Additionally, a c-axis length obtained from the Rietveld analysis of the X-ray diffraction of each of lithium composite oxides according to various embodiments of the present invention may be more than 14.177 Å and less than 14.218 Å.

When a doping amount of the lithium composite oxide niobium (Nb) is insufficient, the c-axis length obtained from the Rietveld analysis of the X-ray diffraction of the lithium composite oxide may be 14.177 Å or less. In this case, the effect of stabilizing the crystal structure of the lithium composite oxide may be insufficient, and further, the effect of increasing the lithium ion conductivity of the positive electrode active material may be insignificant.

On the other hand, when the doping amount of niobium (Nb) in the lithium composite oxide is increased instead of the presence of niobium in at least a part of the interface between the primary particles and the surface of the secondary particle, the c-axis length obtained from the Rietveld analysis of the X-ray diffraction may be more than 14.218 Å. In this case, due to niobium oxide or lithium niobium oxide present in at least a part of the interface between the primary particles and the surface of the secondary particle, the effect of inhibiting a side reaction may be insufficient.

Lithium Secondary Battery

Another aspect of the present invention may provide a positive electrode including a positive electrode current collector and a positive electrode active material layer formed on the positive electrode current collector. Here, the positive electrode active material layer may include, as a positive electrode active material, any one of the lithium composite oxides according to various embodiments of the present invention described above.

Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 m, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 m, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flaketype, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

In addition, in another exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support, and then laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or F-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example. Preparation of Lithium Composite Oxide

1) Example 1

A spherical $Ni_{0.91}Co_{0.08}Mn_{0.01}(OH)_2$ hydroxide precursor was synthesized by a co-precipitation method. In a 90 L reactor, 25 wt % NaOH and 30 wt % $NH_4OH$ were put into an aqueous 1.5M sulfuric acid solution of a transition metal composite in which nickel sulfate, cobalt sulfate and manganese sulfate are mixed in a molar ratio of 91:8:1. The pH in the reactor was maintained at 11.5, the temperature of the reactor was maintained at 60° C., and an inert gas $N_2$ was added to the reactor to prevent the prepared precursor from being oxidized. After the completion of synthesis and stirring, washing and dehydration were performed using filter press (F/P) equipment, thereby obtaining a $Ni_{0.91}Co_{0.08}Mn_{0.01}(OH)_2$ hydroxide precursor.

Subsequently, a lithium composite oxide was prepared by adding LiOH and an Nb-containing raw material ($Nb_2O_5$) to the synthesized precursor and calcinating the same. Specifically, a lithium composite oxide was obtained by mixing LiOH and an Nb-containing raw material ($Nb_2O_5$) with the precursor, subjected to heat treatment for 10 hours in a calcination furnace by raising a temperature 1° C. per minute until 700° C. in an O2 atmosphere, and naturally cooled. The Nb-containing raw material ($Nb_2O_5$) was mixed to be 3 mol % in the total composition before calcination, and mixed to have a molar ratio of 1.03 with respect to the total metal of LiOH.

Subsequently, the obtained lithium composite oxide was subjected to heat treatment in a calcination furnace for 4 hours by elevating a temperature 1° C. per minute until 700° C. in an O2 atmosphere and then naturally cooled.

(2) Example 2

A lithium composite oxide was prepared in the same manner as in Example 1, except that a B-containing raw material ($H_3BO_3$) was mixed with an Nb-containing raw material ($Nb_2O_5$) in calcination. The B-containing raw material ($H_3BO_3$) was mixed to be 1.0 mol % in the total composition.

(3) Example 3

A lithium composite oxide was prepared in the same manner as in Example 1, except that an Al-containing raw material ($Al(OH)_3$) was mixed with an Nb-containing raw material ($Nb_2O_5$) in calcination. The Al-containing raw material ($Al(OH)_3$) was mixed to be 1.0 mol % in the total composition.

(4) Example 4

A lithium composite oxide was obtained by mixing LiOH with the precursor synthesized by the method used in Example 1, subjected to heat treatment in a calcination furnace for 10 hours by elevating a temperature 1° C. per minute until 700° C. in an O2 atmosphere, and then naturally cooled.

Subsequently, the obtained positive electrode active material was mixed with an Nb-containing raw material ($Nb_2O_5$), the mixture was subjected to heat treatment in a calcination furnace for 4 hours by elevating a temperature 1° C. per minute until 700° C. in an O2 atmosphere, and then naturally cooled. The Nb-containing raw material ($Nb_2O_5$) was mixed to be 3 mol % in the total composition before heat treatment.

(5) Example 5

A lithium composite oxide was prepared by mixing the precursor synthesized by the method used in Example 1 with LiOH and a B-containing raw material ($H_3BO_3$). Specifically, a lithium composite oxide was obtained by mixing the precursor with LiOH and $H_3BO_3$, subjected to heat treatment in a calcination furnace for 10 hours by elevating a temperature 1° C. per minute until 700° C. in an O2 atmosphere, and then naturally cooled. The B-containing raw material ($H_3BO_3$) was mixed to be 1 mol % in the total composition before calcination.

Subsequently, the obtained positive electrode active material was mixed with an Nb-containing raw material ($Nb_2O_5$), the mixture was subjected to heat treatment in a calcination furnace for 4 hours by elevating a temperature 1° C. per minute until 700° C. in an O2 atmosphere, and then naturally cooled. The Nb-containing raw material ($Nb_2O_5$) was mixed to be 3 mol % with respect to the lithium composite oxide.

(6) Example 6

A positive electrode lithium composite oxide was prepared in the same manner as in Example 5, except that, instead of a B-containing raw material ($H_3BO_3$), an Al-containing raw material ($Al(OH)_3$) was mixed in calcination.

(7) Comparative Example 1

A positive electrode lithium composite oxide was prepared in the same manner as in Example 1, except that the Nb-containing raw material ($Nb_2O_5$) was mixed to be 1 mol % in the total composition before calcination.

(8) Comparative Example 2

A lithium composite oxide was prepared in the same manner as in Example 1, except that LiOH and an Nb-containing raw material ($Nb_2O_5$) were mixed and then calcinated at 750° C.

(9) Comparative Example 3

A lithium composite oxide was prepared in the same manner as in Example 1, except that LiOH was mixed to have a molar ratio of 1.05 with respect to the total metals before calcination.

(10) Comparative Example 4

A lithium composite oxide was prepared in the same manner as in Example 3, except that the Nb-containing raw material ($Nb_2O_5$) was mixed to be 1 mol % with respect to the lithium composite oxide.

Experimental Example 1. TEM-EDX Analysis of Lithium Composite Oxide

Figure 2:
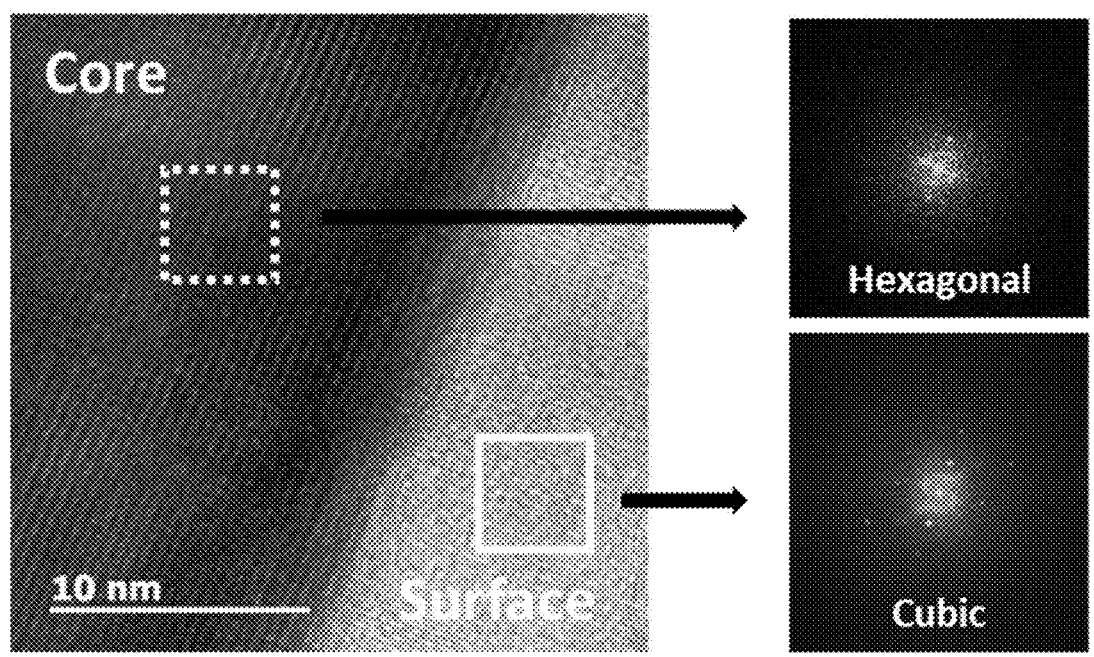
FIG. 2 is a transmission electron microscope (TEM) image of primary particles constituting a lithium composite oxide according to Example 1 and a diffraction pattern of an indicated region.

FIG. 2 is a transmission electron microscope (TEM) image of primary particles constituting a lithium composite oxide according to Example 1 and a diffraction pattern of an indicated region.

Referring to the diffraction pattern shown in FIG. 2, it can be confirmed that the core region of the primary particle has a hexagonal crystal structure (hexagonal α-$NaFeO_2$) with an R-3m space group, and also confirmed that a surface region of the primary particle (the interface between adjacent primary particles) has a cubic crystal structure.

Figure 3:
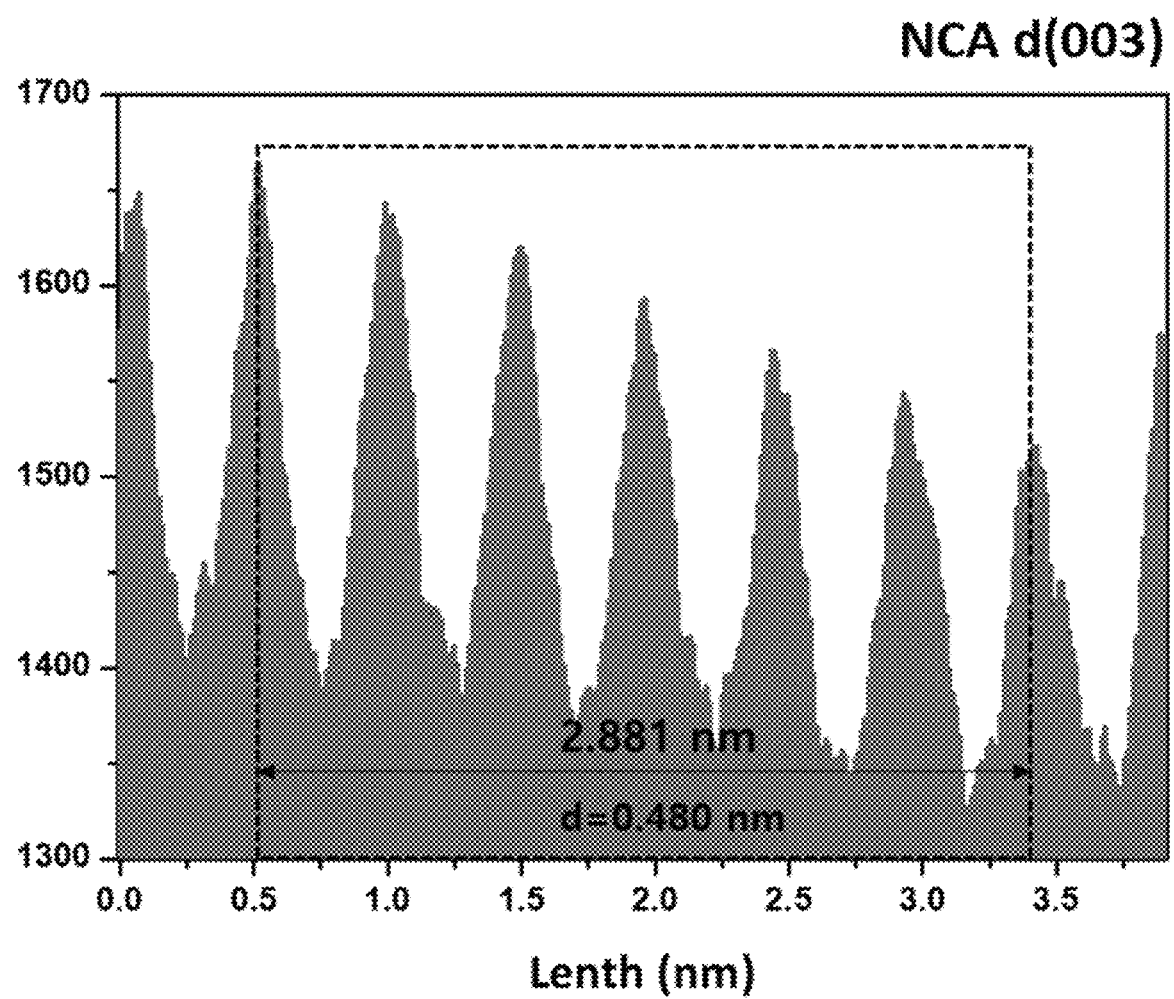
FIGS. 3 and 4 show results of measuring interplanar distances in regions corresponding to a hexagonal crystal structure and a cubic crystal structure, which are shown in FIG. 2, respectively.
Figure 4:
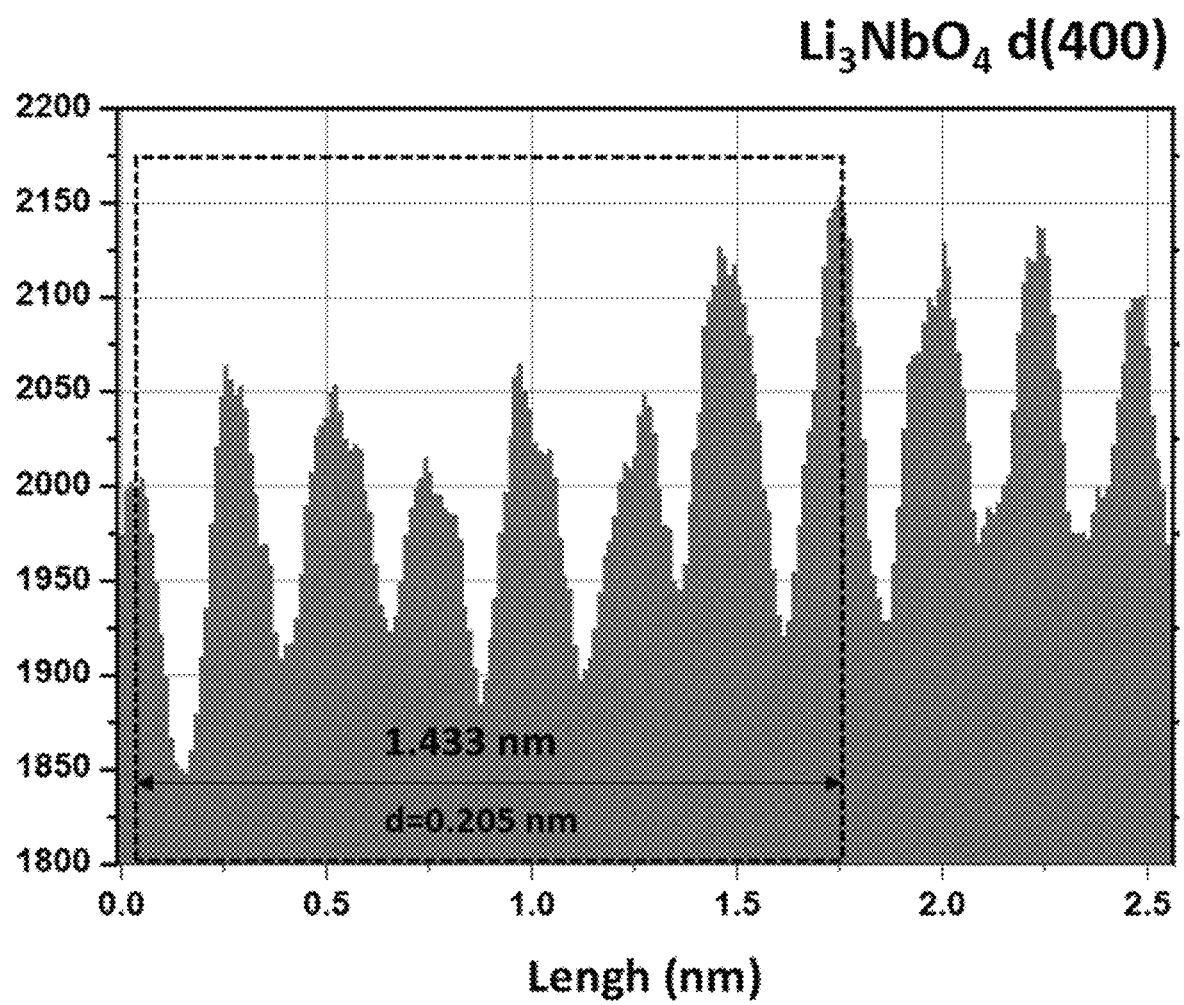

FIGS. 3 and 4 show results of measuring interplanar distances in regions corresponding to a hexagonal crystal structure and a cubic crystal structure, which are shown in FIG. 2, respectively, and the interplanar distance was expressed as an average value between seven adjacent planes in the TEM image of FIG. 2.

Referring to FIGS. 3 and 4, the interplanar distance (d1) of a (003) plane of the crystal structure in the primary particle of the lithium composite oxide was 0.480 nm, whereas the interplanar distance (d2) of a (400) plane of the crystal structure in the interface between primary particles of the lithium composite oxide was measured to be 0.205 nm. Referring to the above results, it can be confirmed that the interplanar distance (d1) of the (003) plane of the crystal structure in the primary particle and the interplanar distance (d2) of the (400) plane of the crystal structure in the interface between the primary particles satisfy Relational Expression 1 and Relational Expression 2 below.

$$d1 > d2 \qquad \text{<Relational Expression 1>}$$

$$d1 - d2 \geq 0.10 \qquad \text{<Relational Expression 2>}$$

In addition, the interplanar distances (d1) of the (300) plant of the crystal structure in a primary particle and the interplanar distances (d2) of the (400) plane of the crystal structure in the interface between primary particles of the lithium composite oxides according to other examples and comparative examples are shown in Table 1 below.

FIGS. 5 to 8 show TEM/EDX mapping results for the lithium composite oxides according to Example 1, Example 3, Example 6 and Comparative Example 1, respectively.

TABLE 1

| Classification | d1 | d2 | d1 − d2 |
|---|---|---|---|
| Example 1 | 0.4804 | 0.2051 | 0.2753 |
| Example 2 | 0.4807 | 0.2051 | 0.2756 |
| Example 3 | 0.4804 | 0.2050 | 0.2754 |
| Example 4 | 0.4806 | 0.2049 | 0.2757 |
| Example 5 | 0.4807 | 0.2050 | 0.2757 |
| Example 6 | 0.4805 | 0.2050 | 0.2755 |
| Comparative Example 1 | 0.4755 | 0.4785 | −0.0030 |
| Comparative Example 2 | 0.4810 | 0.4805 | 0.0005 |
| Comparative Example 3 | 0.4749 | 0.4780 | −0.0031 |
| Comparative Example 4 | 0.4799 | 0.4804 | −0.0005 |

Figure 5:
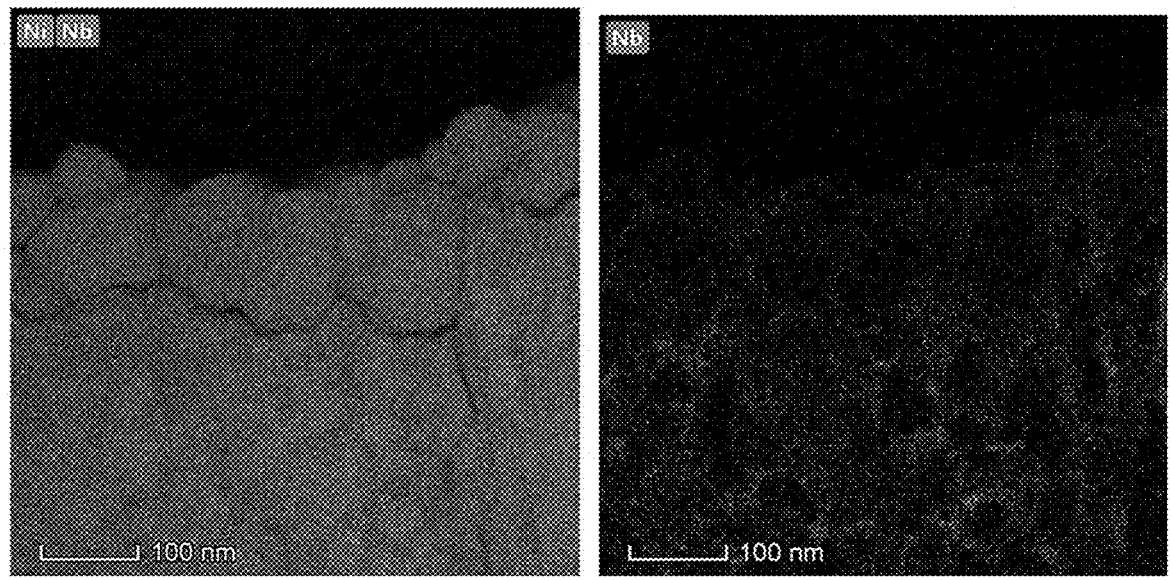
FIGS. 5 to 8 show the distribution of a metal element measured by TEM/EDX mapping results for the lithium composite oxides according to Example 1, Example 3, Example 6 and Comparative Example 1, respectively.
Figure 6:
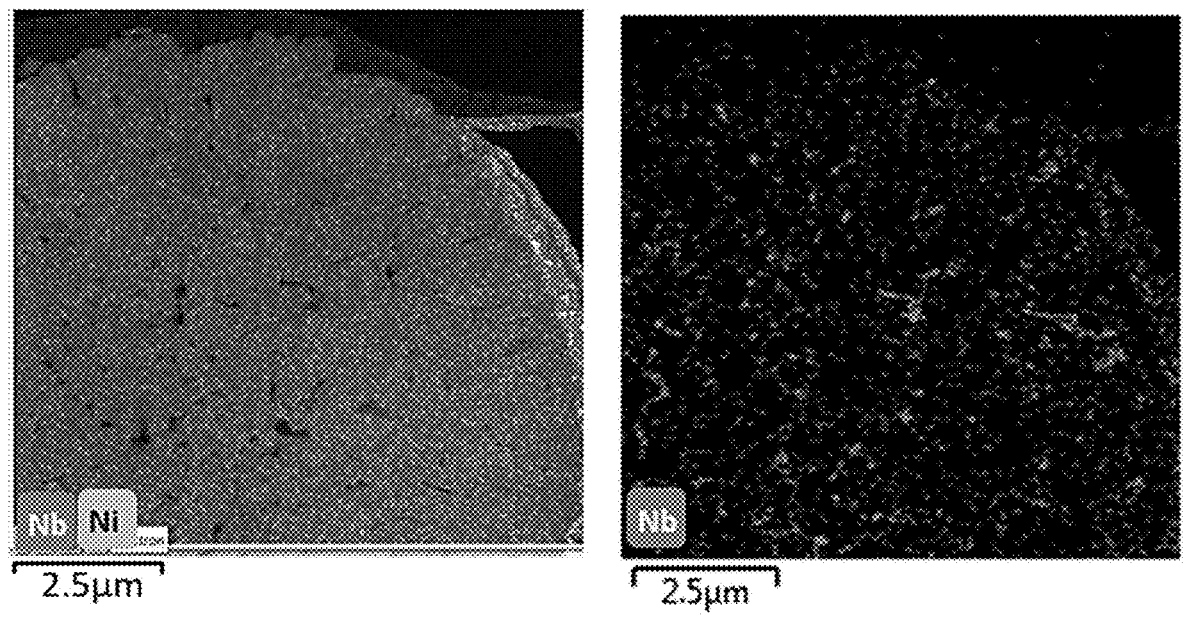
Figure 7:
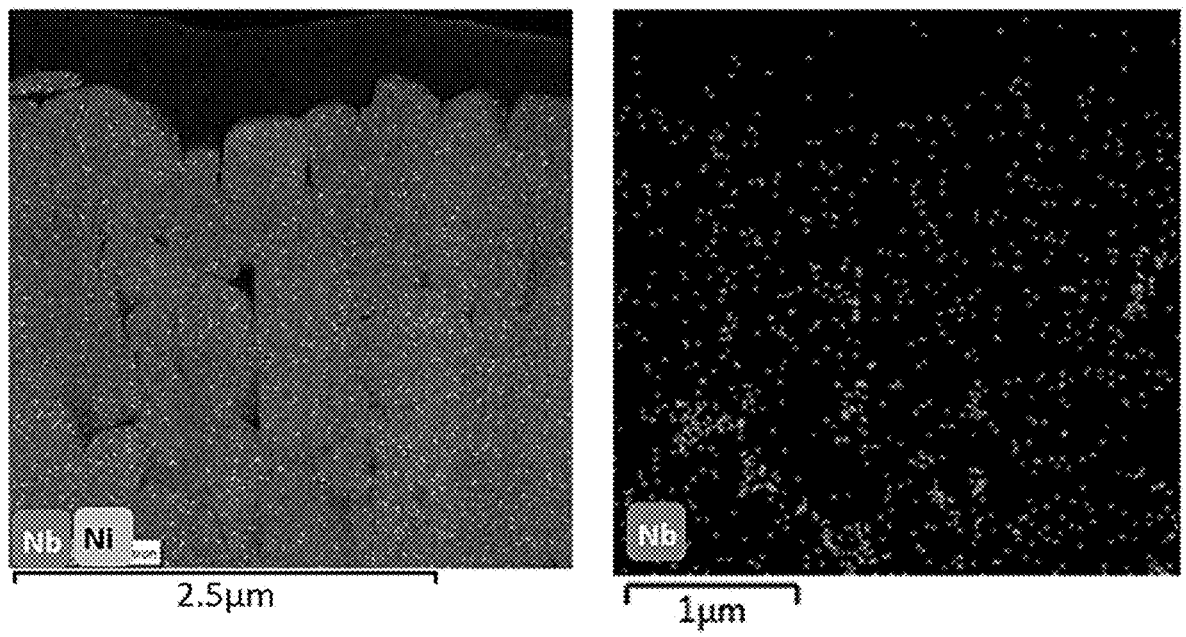

Referring to FIGS. 5 to 7, it can be confirmed that Nb is present in at least a part of the grain boundary of primary particles and the surface of the secondary particle in the lithium composite oxides according to Example 1, Example 3 and Example 6, and particularly, Nb is partially doped into a primary particle.

Figure 8:
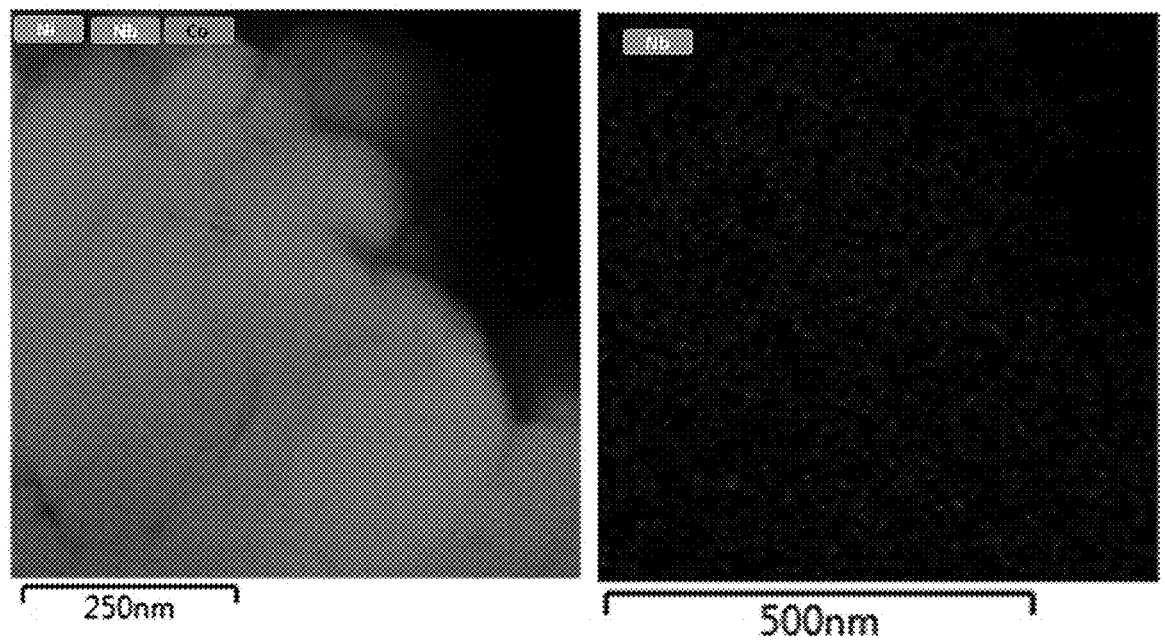

However, referring to FIG. 8, in the lithium composite oxide according to Comparative Example 1, Nb is partially doped only into primary particles, but not present at the grain boundary between primary particles and on the surface of a secondary particle.

Likewise, a lithium composite oxide in which Nb is doped only into primary particles, but Nb (or Nb-containing oxide) is not present in at least a part of the grain boundary between primary particles and the surface of a secondary particle, it may be difficult to expect an effect of improving the stability of a crystal structure and thermal stability, which are intended by the present invention.

In addition, as shown in Table 2 below, it was observed that the c-axis length of the primary particle is significantly changed according to an amount of the niobium (Nb)-containing raw material added in the preparation of a lithium composite oxide.

TABLE 2

| Classification | a | c | c/a |
|---|---|---|---|
| Example 1 | 2.8797 | 14.211 | 4.934 |
| Example 2 | 2.8786 | 14.206 | 4.934 |
| Example 3 | 2.8775 | 14.209 | 4.938 |
| Example 4 | 2.8746 | 14.196 | 4.938 |
| Example 5 | 2.8731 | 14.189 | 4.939 |
| Example 6 | 2.8730 | 14.190 | 4.939 |
| Comparative Example 1 | 2.8684 | 14.176 | 4.936 |
| Comparative Example 2 | 2.8799 | 14.218 | 4.942 |
| Comparative Example 3 | 2.8782 | 14.218 | 4.940 |
| Comparative Example 4 | 2.8681 | 14.177 | 4.937 |

Referring to the result of Table 2, in Comparative Examples 1 and 4, it can be confirmed that the c-axis length of the primary particle is shorter than that in Example 1. Such a c-axis length difference indicates that the niobium (Nb) doping amounts in the primary particles of the lithium composite oxides according to Comparative Examples 1 and 4 are less than that of the primary particles of the lithium composite oxide according to Example 1.

In addition, in Comparative Examples 2 and 3, it can be confirmed that the c-axis length is longer than that in Example 1. This result indicates that, in the lithium composite oxides according to Comparative Examples 2 and 3, there is no Nb (or an Nb-containing oxide) in at least a part of the grain boundary of primary particles and the surface of a secondary particle, and as Nb is doped only into primary particles, the c-axis length is longer than that of the lithium composite oxide according to Example 1.

Experimental Example 2. XRD Analysis of Lithium Composite Oxide

The lithium composite oxides prepared according to the preparation examples were subjected to X-ray diffraction (XRD) analysis to confirm whether there was a niobium (Nb)-containing oxide in the lithium composite oxide. The XRD analysis was performed with a Bruker D8 Advance diffractometer using Cu Kα radiation (1.540598 Å).

Figure 9:
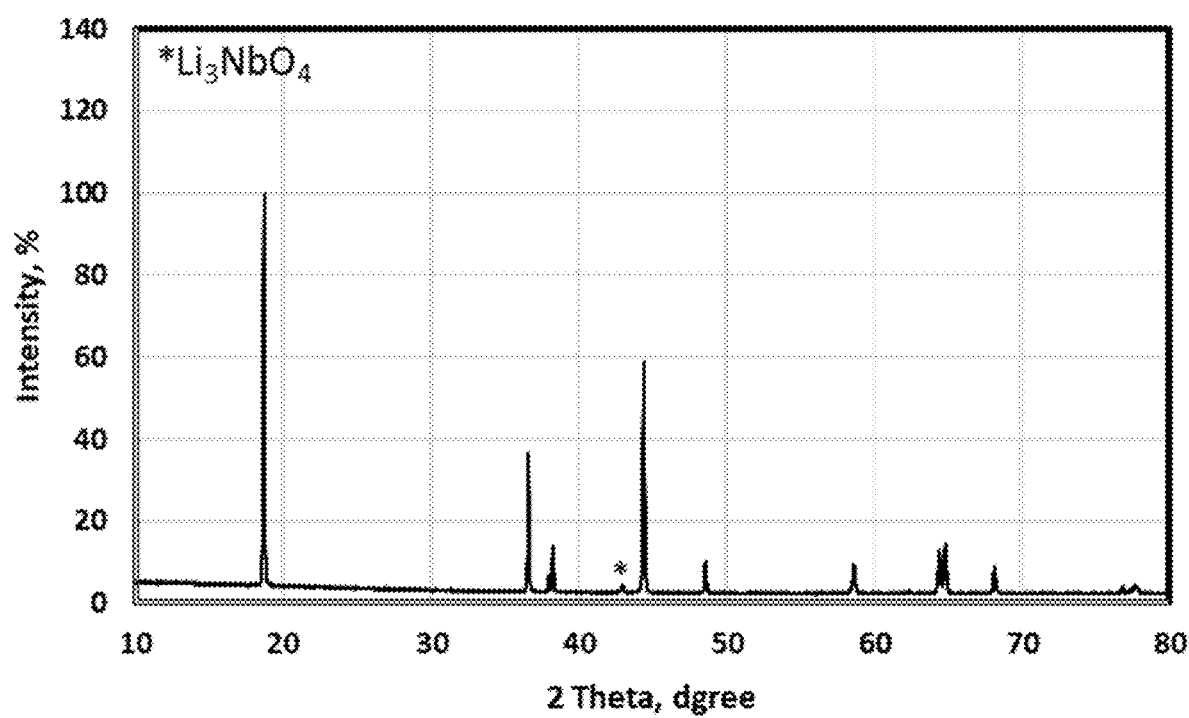
FIGS. 9 and 10 show XRD analysis results for the lithium composite oxide according to Example 1.
Figure 10:
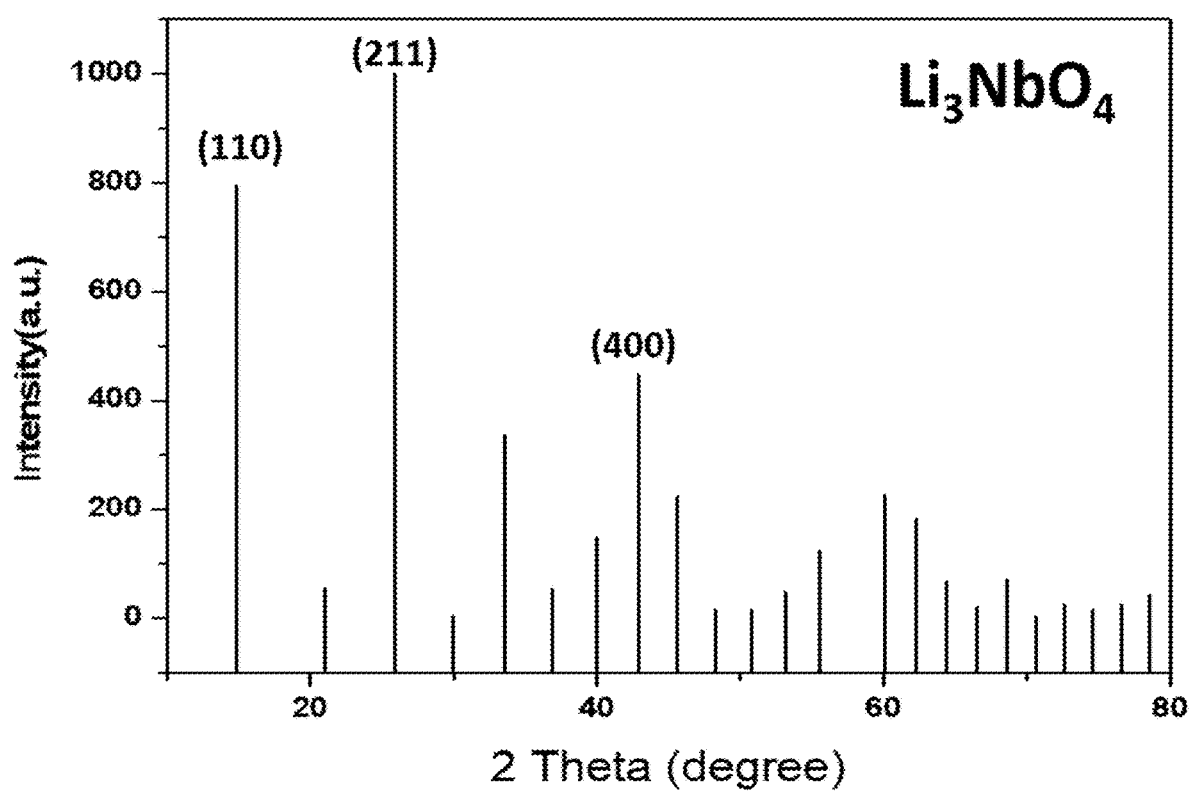

FIGS. 9 and 10 show XRD analysis results for the lithium composite oxide according to Example 1. Referring to FIGS. 9 and 10, it can be confirmed that (111), (211) and (400) peaks specific for $Li_3NbO_4$ of the lithium composite oxide are detected.

Putting the result of TEM/EDX analysis of FIG. 5 and the result of XRD analysis of FIG. 9 together, it can be confirmed that, in the lithium composite oxide according to Example 1, Nb is present in a state of being doped into the primary particle, and also present as a lithium composite oxide in at least a part of the grain boundary between primary particles and the surface of a secondary particle.

Figure 11:
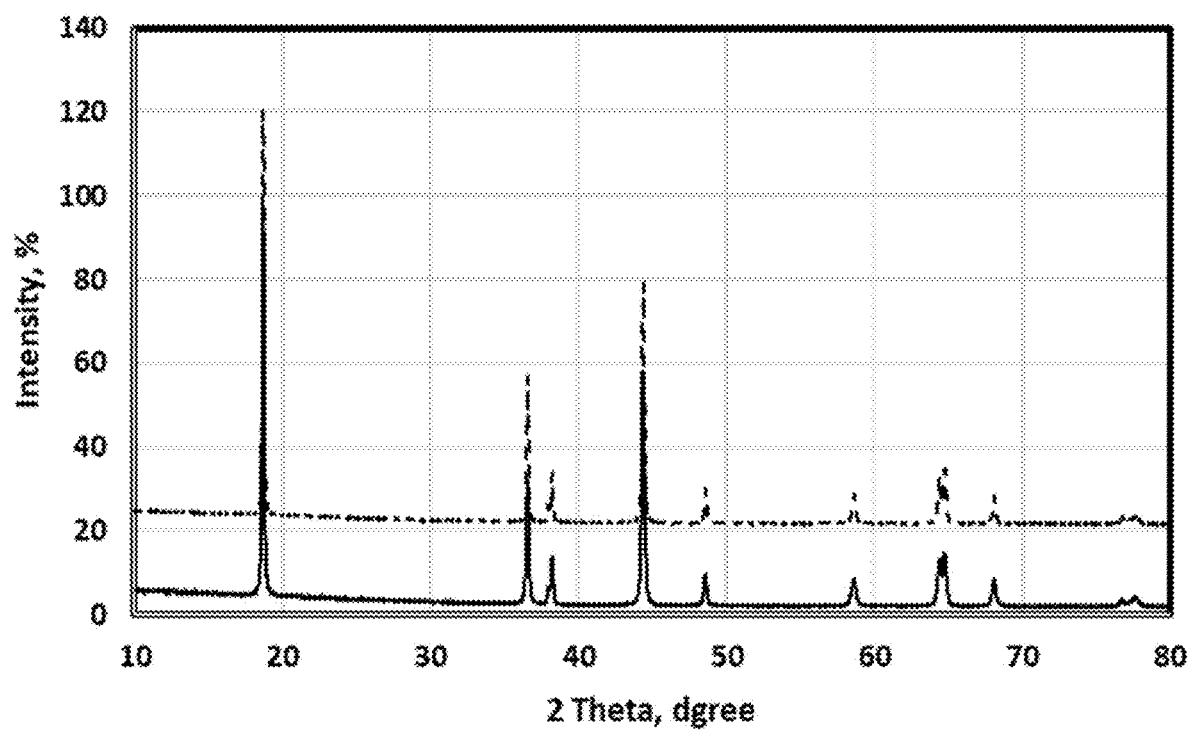
FIG. 11 shows the XRD analysis result for the lithium composite oxide according to Comparative Example 1.

FIG. 11 shows the XRD analysis result for the lithium composite oxide according to Comparative Example 1. Referring to FIG. 11, no specific peak for the lithium composite oxide, such as an Nb-containing oxide, and particularly, an Nb-containing lithium composite oxide, is observed.

Putting the TEM/EDX analysis result of FIG. 8 and the XRD analysis result of FIG. 11 together, it can be confirmed that, in the lithium composite oxide according to Comparative Example 1, Nb is present only in a state of being doped into the primary particle.

Experimental Example 3. Result of Evaluating Characteristics of Lithium Secondary Battery (1) Manufacture of Lithium Secondary Battery A positive electrode slurry was prepared by dispersing 94 wt % of each of the lithium composite oxides prepared according to the preparation examples, 3 wt % of carbon black and 3 wt % of a PVDF binder in 30 g of N-methyl-2 pyrrolidone (NMP). A positive electrode was prepared by applying the positive electrode slurry to a 15-μm-thick aluminum (Al) thin film, which is a positive electrode current collector, drying the resulting thin film and then performing roll pressing. The positive electrode had a loading level of 10 mg/cm², and an electrode density of 3.2 g/cm³.

Against the positive electrode, a metal lithium was used as a counter electrode, and as an electrolyte solution was prepared by adding 1.15M $LiPF_6$ to a solvent in which ethylene carbonate (EC), ethyl methyl carbonate (EMC) and dimethyl carbonate (DMC) were mixed in a volume ratio of 2:4:4.

A lithium secondary battery (coin cell) was manufactured by forming a battery assembly by interposing a separator consisting of a porous polyethylene (PE) film between the positive electrode and a negative electrode and injecting the electrolyte solution.

(2) Evaluation of Capacity Characteristics of Lithium Secondary Battery

The manufactured lithium secondary battery (coin cell) was charged at 25° C. with a constant current (CC) of 0.15 C until 4.25 V, and then charged once again with a constant voltage (CV) of 4.25 V until a charge current reached 0.05 mAh. Subsequently, after being left for 20 minutes, the battery was discharged with a constant current of 0.1 C until 3.0 V, followed by measuring a discharge capacity at the first cycle. The charge capacity, discharge capacity, and charging/discharging efficiency during the first charging/discharging are shown in Table 3 below.

TABLE 3

| Classification | Charge capacity (mAh/g) | Discharge capacity (mAh/g) | Charging/discharging efficiency (%) |
|---|---|---|---|
| Example 1 | 238.2 | 213.3 | 89.5 |
| Example 2 | 237.1 | 212.7 | 89.7 |
| Example 3 | 236.4 | 212.2 | 89.7 |
| Example 4 | 237.2 | 213.3 | 89.9 |
| Example 5 | 235.7 | 212.5 | 90.1 |
| Example 6 | 235.1 | 211.8 | 90.1 |
| Comparative Example 1 | 240.1 | 210.1 | 87.5 |
| Comparative Example 2 | 238.2 | 210.3 | 88.2 |
| Comparative Example 3 | 237.9 | 209.0 | 87.8 |
| Comparative Example 4 | 239.4 | 209.0 | 87.3 |

Referring to the result shown in Table 3, it can be confirmed that the lithium secondary batteries using the lithium composite oxides according to Examples 1 to 6 are improved in the charging/discharging efficiency and capacity characteristics, compared with the lithium secondary batteries using the lithium composite oxides according to Comparative Examples 1 to 4.

(3) Evaluation of Thermal Stability of Lithium Secondary Battery

The manufactured lithium secondary battery (coin cell) was charged/discharged 100 cycles at 25° C. with a constant current (CC) of 1 C within a driving voltage range of 3.0 to 4.25 V. Accordingly, after 100 cycles of the charging/discharging at room temperature, cycle capacity retention, which is a ratio of a discharge capacity at the $100^{th}$ cycle to an initial capacity, was measured.

In addition, to confirm the high temperature storage characteristics of the lithium secondary battery, the battery charged/discharged at 25° C. was charged based on 100% SOC to measure resistance and stored at 60° C. for 7 days, and then resistance was measured to confirm a change in resistance.

The measurement result is shown in Table 4 below.

TABLE 4

| Classification | Capacity retention (%) | Resistance before high temperature storage (Ω) | Resistance after high temperature storage (Ω) |
|---|---|---|---|
| Example 1 | 93.1% | 5.1 | 13.7 |
| Example 2 | 93.3% | 4.0 | 17.1 |
| Example 3 | 94.3% | 4.0 | 20.1 |
| Example 4 | 91.3% | 4.3 | 11.5 |
| Example 5 | 93.5% | 6.0 | 15.8 |
| Example 6 | 92.1% | 9.0 | 19.1 |
| Comparative Example 1 | 79.5% | 3.1 | 88.8 |
| Comparative Example 2 | 81.8% | 2.2 | 90.0 |
| Comparative Example 3 | 82.7% | 2.5 | 87.4 |
| Comparative Example 4 | 82.4% | 2.8 | 88.9 |

Referring the result in Table 4, it can be confirmed that lithium secondary batteries using the lithium composite oxides according to Examples 1 to 6 not only have excellent capacity retention, but also have a smaller change in resistance before and after high temperature storage, compared with the lithium secondary batteries using the lithium composite oxides according to Comparative Examples 1 to 4.

Regions exposed to an electrolyte solution, such as the interface between primary particles and the surface of a secondary particle, which are included in a lithium composite oxide as a positive electrode active material, are regions in which a side reaction between the positive electrode active material and the electrolyte solution can occur. If the side reaction between the positive electrode active material and the electrolyte solution occurs, the electrical characteristics of a lithium secondary battery can be degraded and the stability thereof can also be rapidly degraded due to the generation of gas caused by the positive electrode active material.

Since there is a niobium (Nb)-containing oxide in at least a part of a region selected from the interface between the primary particles and the surface of the secondary particle, and the interplanar distance (d1) of a (003) plane of the crystal structure in the primary particle is formed to be larger than the interplanar distance (d2) of a (400) plane of the crystal structure in the interface between the primary particles, the lithium composite oxide according to the present invention can stabilize the crystal structure of the lithium composite oxide. In addition, through this, a side reaction between the primary particles included in the lithium composite oxide can be inhibited.

The lithium composite oxide according to the present invention can be used as a positive electrode active material for a lithium secondary battery, thereby improving the stability of the positive electrode active material and the electrical characteristics thereof.

Above, while the examples of the present invention have been described, it will be understood by those of ordinary skill in the art that the present invention may be changed and modified in various ways by addition, alteration, or deletion of components without departing from the spirit of the present invention defined in the appended claims.

What is claimed is:

1. A lithium composite oxide, comprising:
primary particles enabling lithium intercalation and deintercalation and a secondary particle in which the primary particles are aggregated,
wherein a niobium (Nb)-containing oxide is present in at least a part of a region selected from an interface between the primary particles and a surface of the secondary particle, and
an interplanar distance (d1) of a (003) plane of a crystal structure in the primary particle and an interplanar distance (d2) of a (400) plane of a crystal structure in the interface between the primary particles satisfy Relational Expression 1 below.

$$d1-d2>0.0005 \quad \text{<Relational Expression 1>}$$

2. The lithium composite oxide of claim 1, wherein the interplanar distance (d1) of the (003) plane of the crystal structure in the primary particle is 0.40 nm or more.

3. The lithium composite oxide of claim 1, wherein the interplanar distance (d2) of the (400) plane of the crystal structure in the interface between the primary particles is 0.30 nm or less.

4. The lithium composite oxide of claim 1, wherein niobium (Nb) is doped into the primary particle.

5. The lithium composite oxide of claim 4, wherein the niobium (Nb) in the primary particle has a concentration gradient decreasing from a surface region to a core region of the primary particle.

6. The lithium composite oxide of claim 1, wherein the primary particle is represented by Formula 1 below:

$$Li_wNi_{1-(x+y+z+z')}Co_xM1_yM2_zNb_{z'}O_2 \quad \text{[Formula 1]}$$

wherein, M1 is at least one selected from Mn and Al,
M2 is at least one selected from P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu,
M1 and M2 are different elements, and
$0.5 \leq w \leq 1.5$, $0 \leq x \leq 0.50$, $0 \leq y \leq 0.20$, $0 \leq z \leq 0.20$, and $0 \leq z' \leq 0.20$.

7. The lithium composite oxide of claim 1, further comprising:
a first coating layer covering at least a part of the surface of the primary particle,
wherein the first coating layer comprises a niobium (Nb)-containing oxide.

8. The lithium composite oxide of claim 7, wherein the first coating layer further comprises an oxide represented by Formula 2 below:

$$Li_aM3_bO_c \quad \text{[Formula 2]}$$

wherein, M3 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 < b \leq 8$, and $2 \leq c \leq 13$.

9. The lithium composite oxide of claim 1, further comprising:
a second coating layer covering at least a part of the surface of the secondary particle,
wherein the second coating layer is an oxide represented by Formula 3 below:

$$Li_aM4_bO_c \quad \text{[Formula 3]}$$

wherein,
M4 is at least one selected from Ni, Mn, Co, P, Sr, Ba, B, Ti, Zr, Mn, Al, W, Nb, Fe, Cu, Mo, Cr, Zn, Na, K, Ca, Mg, Pt, Au, Eu, Sm, Ce, V, Ta, Sn, Hf, Ce, Gd and Nd, and $0 \leq a \leq 10$, $0 < b \leq 8$, and $2 \leq c \leq 13$.

10. The lithium composite oxide of claim 1, wherein a c-axis length obtained from a Rietveld analysis of X-ray diffraction is more than 14.177 Å and less than 14.218 Å.

11. A lithium secondary battery using a positive electrode comprising the lithium composite oxide according to claim 1.

* * * * *